(12) United States Patent
Campbell et al.

(10) Patent No.: US 6,571,935 B1
(45) Date of Patent: Jun. 3, 2003

(54) MONOLITHIC BELT WITH REINFORCED SIDEWALL

(75) Inventors: Colin D. Campbell, South Jordan, UT (US); Mark Schmidt, Farmington, UT (US)

(73) Assignee: Cambelt International Corporation, Salt Lake City, UT (US)

(*) Notice: Subject to any disclaimer, the term of this patent is extended or adjusted under 35 U.S.C. 154(b) by 0 days.

(21) Appl. No.: 09/599,344

(22) Filed: Jun. 22, 2000

(51) Int. Cl.[7] .............................................. B65G 15/40
(52) U.S. Cl. ............................... 198/690.2; 198/694.1; 198/820; 198/821; 198/844.1; 198/846
(58) Field of Search .............................. 198/690.2, 699, 198/699.1, 820, 821, 846, 847, 844.1, 715

(56) References Cited

U.S. PATENT DOCUMENTS

| | | | | |
|---|---|---|---|---|
| 416,663 A | * | 12/1889 | Blasdel ........................ 198/201 |
| 550,517 A | * | 11/1895 | Loring ......................... 198/821 |
| 683,547 A | * | 10/1901 | Bowers ........................ 198/821 |
| 2,711,816 A | | 6/1955 | Reno |
| 2,831,215 A | * | 4/1958 | Piedmont ..................... 198/820 |
| 3,545,598 A | * | 12/1970 | McGinnis ..................... 198/201 |
| 3,557,941 A | * | 1/1971 | Thomson ..................... 198/201 |
| 3,578,149 A | * | 5/1971 | Thomson ..................... 198/201 |
| 3,633,428 A | * | 1/1972 | Pott ............................. 74/231 |
| 3,750,864 A | * | 8/1973 | Nolte .......................... 198/201 |
| 4,061,223 A | * | 12/1977 | McGinnis .................... 198/821 |
| 4,109,784 A | * | 8/1978 | Hartmann .................... 198/821 |
| 4,475,669 A | * | 10/1984 | Wahl .......................... 198/821 |
| 4,844,241 A | | 7/1989 | Woodward |
| 5,141,101 A | * | 8/1992 | Vance et al. ................. 198/847 |
| 5,875,883 A | * | 3/1999 | Ertel et al. ................... 198/821 |
| 5,975,283 A | * | 11/1999 | Riffe ........................... 198/821 |

* cited by examiner

*Primary Examiner*—Khoi H. Tran
(74) *Attorney, Agent, or Firm*—Thorpe North & Western, LLP.

(57) ABSTRACT

A monolithic conveyor belt structure comprising an elongate, substantially planar base belt having a pair of integrally formed, flexible, fabric reinforced, longitudinal sidewalls protruding from its top face. The integral construction prevents delamination of the sidewalls from the base belt, and the fabric reinforcement in the sidewalls strengthens the sidewalls against deterioration due to repeated flexure of the belt, and due to contact with pulleys, turn disks, sliding surfaces, etc. The belt may include cleats between the sidewalls, such as transverse paddles or upstanding nubs, to assist in conveying material on very steep inclines.

20 Claims, 3 Drawing Sheets

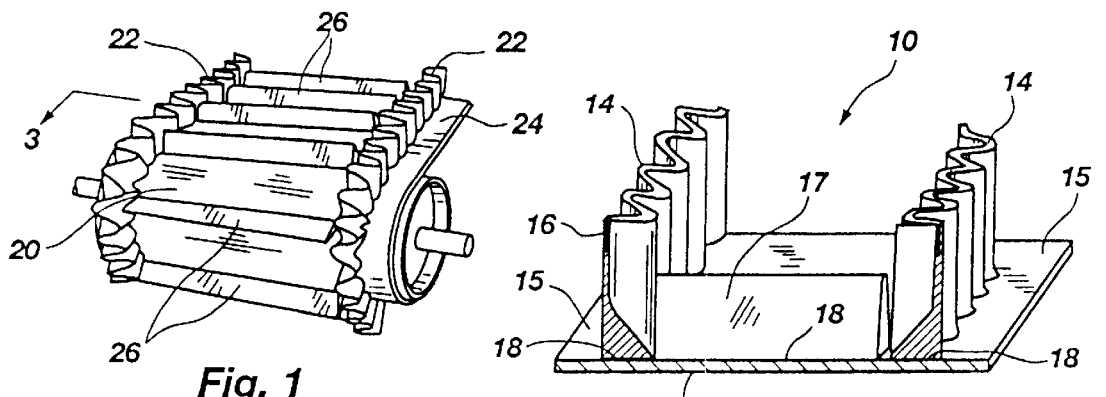
Fig. 1
Fig. 2 (PRIOR ART)
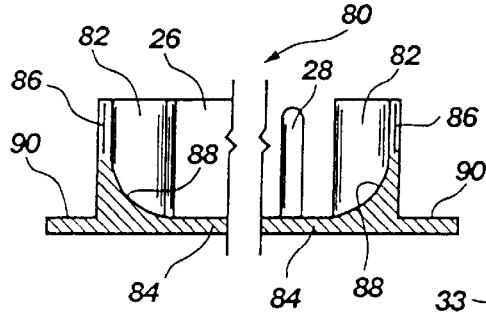
Fig. 3
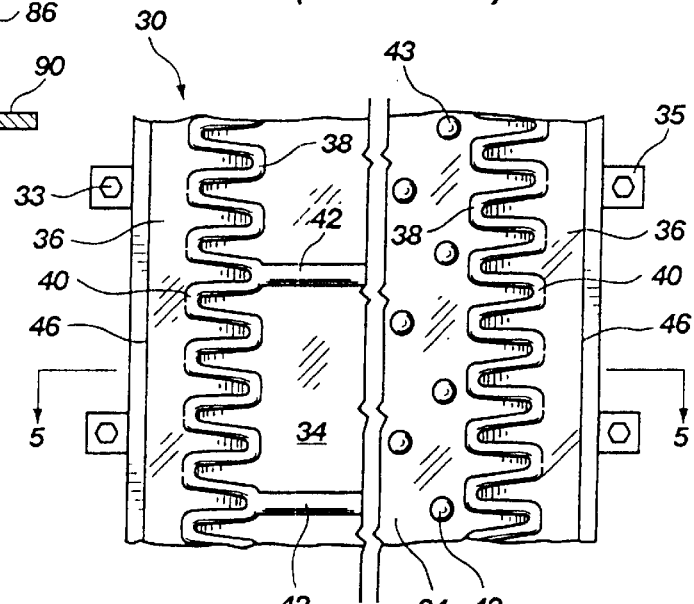
Fig. 4 (PRIOR ART)
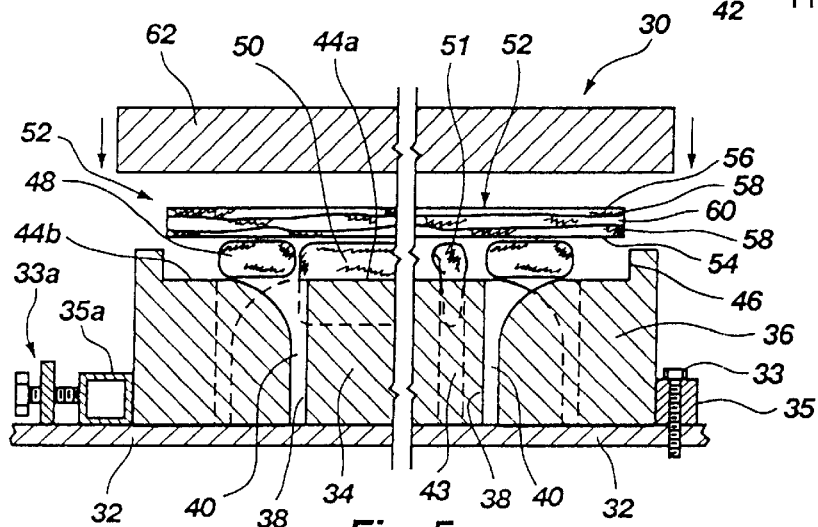
Fig. 5 (PRIOR ART)

MONOLITHIC BELT WITH REINFORCED SIDEWALL

BACKGROUND OF THE INVENTION

1. Field of the Invention

This invention relates to flexible conveyor belts. More particularly, the present invention relates to a rubber conveyor belt having an integrally formed sidewall with fabric reinforcement.

2. State of the Art

Conveyor belts of various designs have been used for centuries to convey materials from one location to another. One of the oldest types of conveyor is the trough conveyor, wherein a flexible conveyor belt is disposed over rollers or supports which are formed into a generally U-shaped trough. This type of conveyor has the disadvantage that it cannot be used to transport material up an incline having an angle that is greater than the dynamic angle of repose of the material which is being transported. Because they flex in multiple dimensions, trough conveyor belts cannot easily be provided with cleats or other devices for assisting in transporting the material up steep inclines.

To overcome this problem, conveyor belts have been developed having a flat base belt, upstanding longitudinal sidewalls, and transverse cleats or other protrusions which extend from the surface of the base belt and provide individual compartments in which the material may be held and lifted for transport up relatively steep inclines. Other belt designs have been developed, including belts with longitudinal sidewalls and a grid pattern of protruding nubs for use with certain types of materials, and belts with attached buckets attached for containing and lifting materials. These newer belt designs allow much steeper incline angles, actually allowing completely vertical conveyance of some materials.

To be useful, conveyor belts must be both flexible and durable. To this end, modern conveyor belts are typically made of synthetic rubber materials, with fabric reinforcement. However, the newer, more complicated belt designs mentioned above present several challenges. Belts having sidewalls are frequently constructed using separately cured components (a base belt and two sidewalls) which are bonded together with adhesives using both "cold" and "hot" processes. While this approach is simple, it is not durable. The repetitive flexing action of belts traveling along a conveyor and around turn disks, drive pulleys, etc., commonly results in the failure of bonded belt sidewalls, wherein the sidewalls tend to delaminate from the planar base belt after relatively brief use. This is because the bond strength from adhesives is usually less than 40% of the strength of the cured rubber material itself. Thus, belts with adhesive bonded sidewalls tend to have a relatively short useful life.

It will be appreciated that rubber parts, whether reinforced or unreinforced, are strongest when an entire piece is molded and cured monolithically. Accordingly, the inventors have developed a method of constructing a flexible rubber belt having sidewalls that are integrally formed and cured with the base belt. With this construction, the problem of delamination of the side wall from the base belt has been eliminated. However, there are some additional problems. First, the exposed top edges of belt sidewalls, whether formed monolithically with the base belt or not, tend to get damaged due to operating stresses, and by contact with guide rollers, sliding surfaces, turn disks, etc. These problems are most pronounced when the sidewalls are relatively large—e.g. 6" tall or more. To address these problems, it would be desirable to include fabric reinforcement in monolithically formed sidewall belts. However, heretofore, there has not been a way to form and cure a belt sidewall monolithically with the base belt and include fabric reinforcement in the sidewall. This is particularly true where the sidewalls are relatively large.

SUMMARY OF THE INVENTION

The invention generally comprises a conveyor belt, having an elongate, substantially planar base belt, at least one longitudinal sidewall extending upwardly from a top face of the base belt along a length thereof, and fabric reinforcement disposed within the sidewall. The sidewall is integrally formed of the material of the base belt, and is simultaneously cured therewith. The invention thus provides a flexible conveyor belt with monolithically formed and cured sidewalls having fabric reinforcement. The sidewalls are thus more durable than prior belt sidewalls, and do not present the likelihood of delamination from the base belt which bonded sidewalls present. The belt may include cleats between the sidewalls, such as transverse paddles or upstanding nubs, to assist in conveying material on steep inclines.

Other advantages and features of the present invention will be apparent to those skilled in the art, based on the following description, taken in combination with the accompanying drawings.

BRIEF DESCRIPTION OF THE DRAWINGS

FIG. 1 is a pictorial view of a conveyor belt having a flat base belt and flexible, corrugated sidewalls with transverse cleats disposed therebetween;

FIG. 2 is a cross-sectional view of a prior art belt having a sidewall adhesively bonded to a base belt;

FIG. 3 is a cross-sectional view of a conveyor belt according to the present invention, wherein the sidewall is integrally formed and cured with the base belt, and fabric reinforcement is disposed within the sidewall;

FIG. 4 is a plan view of a prior art mold for forming a belt with integrally formed sidewalls;

FIG. 5 is a transverse cross-sectional view of a prior art mold for forming a belt with integrally formed sidewalls, having raw rubber charges placed therein;

DETAILED DESCRIPTION OF THE PREFERRED EMBODIMENT

Figure 6:
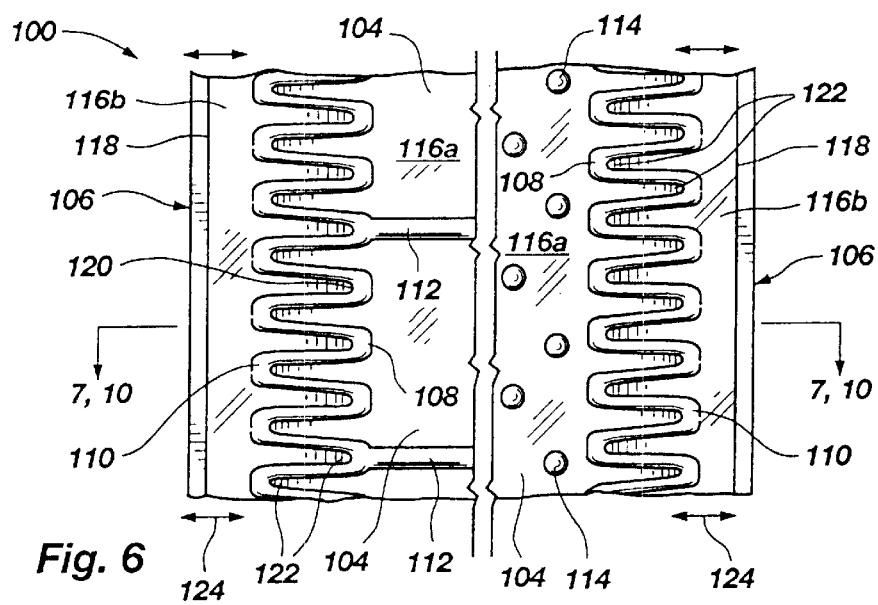
FIG. 6 is a plan view of a conveyor belt mold configured for forming a belt with integrally formed sidewalls having fabric reinforcement according to the present invention.

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Conveyor belts having sidewalls have been known for some time. Viewing FIG. 2, a portion of a typical prior art sidewall belt 10 is shown in a partial cross-sectional view. The belt generally comprises a base belt 12, typically of fabric reinforced rubber, and upright sidewalls 14. The sidewalls 14 are generally formed in a corrugated shape, and may be up to 16 inches high. The belt may also include edge flanges 15 comprising outward extensions of the base belt beyond each sidewall 14, providing a surface for riding against pulleys, turn disks, stub idlers, etc. Cleats 17 may also be disposed between the sidewalls 14, for assisting in transporting material on the belt.

Like the base belt, the sidewall is made of rubber, and may be reinforced with fabric 16, particularly at the top edge of the sidewall. The corrugations allow flexure of the entire belt about an axis X—X, which is perpendicular to the direction of travel of the belt as the belt travels through the conveyor system, and the fabric reinforcement reduces the tendency of the rubber sidewalls to split, tear, or crack at the top, which is an area of high stress. It will be apparent that the dimensions of the corrugations will generally be proportional to the height of the sidewall, so as to allow adequate flexure as the belt moves over drive pulleys, turn disks, etc.

In prior art sidewall belts, the base belt 12, sidewalls 14, and cleats 17 are separately molded and cured elements which are adhesively bonded to each other by either a "hot" or "cold" process. This approach allows for relative ease of production, but also produces an adhesive interface 18 between the base belt 12 sidewall 14, and cleats 17. The cleats may also be configured to extend across the entire base belt and be adhesively bonded to the sidewalls 14, as shown on the left side of FIG. 2. While the adhesive bonding of rubber components can produce relatively strong bonds, these bonds are not nearly as strong as the rubber material itself. An adhesive bond produced by known methods typically produces a bond with less than 40% of the strength of the base rubber material. The result is that the adhesive interface 18 between the base belt 12 and other components is inherently weak, and prior art belts 10 as depicted in FIG. 2 are prone to delamination of the sidewall from the base belt. The flexing action of the belt traveling through the conveyor frequently results in failure of the bonding adhesives, allowing the belt and sidewalls to separate into their original unique shapes. Naturally, when the sidewall separates from the base belt, the relatively expensive belt is no longer useful.

Figure 9:
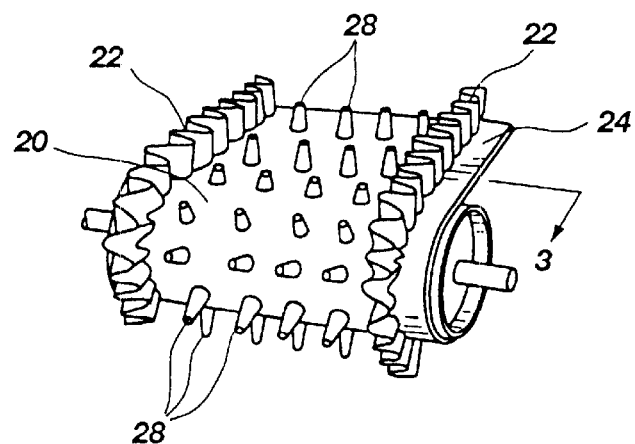
FIG. 9 is a pictorial view of a conveyor belt having a flat base belt and flexible, corrugated sidewalls, with cylindrical protrusions for assisting material in steep inclines.

To overcome this problem, the inventors have developed a belt with flexible sidewalls which are integrally formed with the material of the base belt. Pictorial views of conveyor belts comprising a flat base belt 20 and flexible, corrugated sidewalls 22 are shown in FIG. 1 and FIG. 9. These belts may include an edge flange 24 and transverse paddle-type cleats 26, or upstanding cleats 28 attached to the base belt 20 between the sidewalls 22. The transverse cleats 26 are preferably used to contain conveyed materials during inclined travel of the conveyor belt, and, like prior art sidewall belts, may be connected to the sidewalls as shown in FIG. 2, or not connected to the sidewalls, as in FIG. 1. The transverse cleats 26 may be substantially planar and generally perpendicular to the plane of the base belt as shown, or may be curved, angled, or in any other suitable configuration, depending upon the material, the angle of incline of the conveyor, etc. The transverse cleats 26 may also be connected to the sidewalls 22, providing a full width compartment for holding the material to be conveyed. This feature is particularly helpful in the conveyance of free-flowing or semi-liquid materials. The upstanding cleats 28 may comprise protrusions, nubs, or other shapes, and are also designed to assist with inclined conveyance or travel of conveyed materials. They may have many different cross-sectional shapes and spacings, and may be tapered, prismatic, or any other shape which helps hold the material to the conveyor belt and convey it up an incline. Other types of cleats may also be devised for performing the same functions.

The base belt 20 and sidewalls 22 are molded and cured simultaneously via a method previously developed by the inventors. Referring to FIGS. 4 and 5, there are shown plan and transverse cross-sectional views of a mold 30 for forming a belt with integrally formed sidewalls. It will be appreciated that the mold 30 of FIGS. 4 and 5 forms the belt upside down relative to its depiction in FIGS. 1 and 9.

The mold 30 generally comprises a base plate 32, to which are attached a raised center section 34, and two side sections 36. The base plate, center section, and side sections are rigidly attached to the base plate and held in place by anchor blocks 35 and anchor bolts 33. Other methods of anchoring the mold assembly to a base may also be used, such as clamps, wedges, welding the mold sections to the base, etc. For example, the inventors have used a combination of screw clamp assemblies 33a with steel bars and square tubing 35a to hold the assembly together and resist the large loads that develop when the press closes and the moving raw rubber tries to spread the mold pieces apart under high fluid pressure. Any method which holds the mold parts in proper spatial relationship to each other and anchors them firmly in place in order to withstand the high pressures and stresses of the molding process will be suitable. However, it will be apparent that the width of the belt which can be formed may be limited by the physical size of the external clamping system because of the physical space available inside the press.

The base plate, center section, and side sections are preferably formed of aluminum or steel, so as to be able to withstand the high mechanical and thermal stresses which are imposed during the molding and curing process. Other thermally and mechanically durable materials may be used, so long as they can withstand the high pressures and temperatures. Cured rubber conveyor belts are typically cured under a pressure of from 600 psi to 2000 psi, and at a temperature of from 275° F. to 3255° F. for 20 to 60 minutes. The surfaces of the mold which will come into contact with the rubber parts are treated with a commercially available mold release agent, such as McLube #1829, so as to prevent adhesion of the rubber to the mold.

The side sections 36 are spaced some distance away from the sides 38 of the center section 34, so as to form side channels 40, which provide the openings or mold spaces for forming the sidewalls of the belt. It will be apparent that the side channels 40 have a width which is equal to the desired sidewall thickness. Transverse channels 42 and/or vertical bores 43 are provided in the center section for forming the transverse paddle-type cleats or vertical nub-type cleats upon the belt. It will be apparent that other openings may be formed in the mold sections so as to allow formation of any shape of cleat or other feature desired upon the base belt.

The center section 34 and side sections 36 have top surfaces 44a and 44b, respectively, which are in general horizontal alignment and provide a surface upon which the base belt is formed. The channels or openings 40 for the sidewalls and other openings such as channels 42 and bores 43 extend downward from the top surfaces 44, thus providing a continuous mold space which allows integral formation of the base belt, sidewalls, and other components. The side sections 36 each have an edge wall 46 adjacent to the top surface 44b, which defines the outer edge of the base belt. It will be apparent that the location of the edge wall 46 relative to the nearest side channel 40 (which forms the sidewall) is dependent upon the desired dimension of the edge flange 24, if desired. The height of the edge wall 46 is dependent upon the thickness of the base belt and any operational constraints which may apply to the pressing and curing process.

As shown in the plan view of FIG. 4, the sides 38 of the center section 34, and the opposing faces of the side sections 36 have alternating protrusions, forming a complementary corrugated configuration, which forms the corrugated sidewall channel 40. It will be apparent that many shapes may be used for the sidewalls. However, a uniform corrugated shape is preferred because it is believed to provide the simplest flexible wall configuration for containing the conveyed material and traveling over drive pulleys, turn disks, etc. The width of the side channel 40 is exactly equal to the desired sidewall thickness.

Viewing FIG. 5, to form a belt having integral sidewalls, an elongate charge 48 of raw rubber is first placed along the top of the side channels 40. Other charges 50, 51 of raw rubber are placed atop or partially extending into the transverse channels 42 or vertical bores 43, if present. These charges of rubber will partially liquify and flow into their respective openings during the curing process, thus forming the cleats. A base belt lay-up 52, comprising a top cover 54, a bottom cover 56, and one or more layers of woven fabric reinforcement 58, is then placed atop the mold, extending between opposing edge walls 46. The top cover and bottom cover are sheets of raw rubber, and additional sheets 60 of raw rubber are also placed between multiple layers of fabric reinforcement 58.

To begin the molding and curing process, the mold supplied with the raw rubber is placed into a press, where a horizontal press plate 62 is brought to bear upon the bottom cover 56 of the base belt lay-up 52, between the edge walls 46. The press plate 62 presses downward and seals between the edge walls, producing a high pressure of up to 2000 psi, while the mold is simultaneously heated to a high temperature, such as 300° F. The combination of high temperature and pressure causes the elongate charges of rubber 48 to flow into the side channels, and the other charges of raw rubber 50, 51 to flow into their respective mold openings, thus forming the sidewalls and cleats of the belt. At the same time, the raw rubber of charges 48 and 50 or 51 comingle in a semi-liquid state with the raw rubber of the top cover 54, creating a liquid mass of rubber material which cures as an integral unit. The condition of elevated temperature and pressure is maintained for a period of time sufficient to cure the belt, the mold is then removed from the press, and the belt is physically removed from the mold as a finished unit.

As a result of this integral or monolithic molding process, there is no weakened interface between the base belt and the sidewalls, or between the base belt and cleats, as occurs in belts where the components are attached via adhesives. Rather, the base belt and sidewalls comprise one monolithic piece, integrally molded and formed, having 100% of its material strength in the transition from base belt to sidewall, rather than an adhesive interface with less than 40% strength. The inventors have found that this belt configuration eliminates the problem of delamination of the sidewall from the base belt throughout the useful life of the belt, and also reduces breakage of or damage to the cleats.

Unfortunately, the method of integrally forming sidewalls described above limits the overall possible height of the sidewalls. Because raw rubber charges must be placed above the openings in the mold, the openings or channels can be no deeper than the molten rubber is able to flow into during the heating and curing process. Those skilled in the art will recognize that to properly cure a rubber product such as a conveyor belt, it is not desirable to heat the rubber to a temperature that allows it to flow very readily. If the raw rubber is heated to a temperature which allows it to flow into a deeper side channel, the additional thermal energy causes the polymer molecules to undergo undesirable chemical changes which damage the properties of the finished product. If the proper temperature is used, the rubber will not completely flow into deep side channels, resulting in imperfectly formed sidewalls. Thus, the flowability of the rubber is limited, limiting the depth of channels into which one may expect the rubber to adequately flow. The inventors have found that by their previous method, side channels having a width of about ½ inch are limited to about 6 inches in depth, thus limiting the sidewalls to about 6 inches in height.

Moreover, the method described above does not allow fabric reinforcement to be placed into the sidewalls. The inventors have attempted to integrally form fabric reinforced sidewalls by placing a strip of reinforcing fabric into the side channel 40 of the mold 30 before forming the belt. However, because the rubber for the sidewalls flows down into the side channel as a liquid during the forming and curing process, the fabric reinforcement becomes displaced. The vertical movement of the raw rubber as it flows downward into the corrugated side channels tends to push any reinforcement placed in the side channel down into the bottom of the side channel, resulting in a mass of essentially useless fabric clumped into portions of the sidewall where it is not desired, or where it is non-functional. This is unacceptable both for practical service and from an aesthetic point of view.

Alternatively, the inventors have attempted to place fabric reinforcement into the sidewalls by placing both fabric and raw rubber into the side channels. The inventors placed a lay-up comprising sheets of raw rubber with one or more layers of fabric interspersed therebetween into the side channels 40 before placing the other raw rubber charges for the belt. However, in order to place a lay-up of raw rubber and fabric into the side channel of the mold 30, the lay-up must necessarily be significantly thinner than the side channel opening. Two factors account for this. The first relates to mold tolerances. Because the inner and outer radii of the corrugations are not always perfectly aligned, the width of the side channel varies slightly. Naturally, the lay-up can be no thicker than the narrowest portion of the side channel. Second, raw rubber is very tacky, and tends to easily stick to the surfaces of the mold, particularly when it is hot. Consequently, additional raw rubber charges must still be placed above the side channels in order to provide sufficient rubber volume.

It was hoped that the provision of a lay-up of raw rubber sheets with fabric reinforcement would reduce the downward flow of rubber enough to allow the reinforcement to stay in place. However, the inventors found that even in this configuration, there is enough vertical movement of the raw rubber, as it flows downward to fill the corrugated side channels, that the fabric reinforcement becomes wrinkled and mashed into the bottom of the side channel. Once again, the result was an aesthetically and functionally unacceptable mass of fabric clumped into the top end of the sidewall. The inventors have also experimented in different ways with fabric, rope, string, and even various fibrous materials which are mixed in with the raw rubber to try to increase the tear strength of the sidewall in the area of high stress. None of these approaches have produced satisfactory results.

Advantageously, after extensive experimentation, the inventors have developed a method of placing fabric reinforcement into integrally formed sidewalls, which also allows taller sidewalls, making the present invention possible. FIG. 3 is a cross-sectional view of a conveyor belt 80 according to the present invention, wherein the sidewall 82 is integrally formed and cured with the base belt 84, and fabric reinforcement 86 is disposed within the sidewall. A transverse fillet 88 is formed within each corrugation at the junction of the sidewall and the base belt to provide additional strength, and an edge flange 90 is provided for running against turn disks, stub idlers, etc. as described above. The belt may also include transverse cleats 26 and/or upstanding cleats 28, as discussed previously. The integral formation of the sidewalls, cleats, and base belt prevents delamination of the sidewall and other elements from the base belt, and the fabric reinforces the high stress top region of the sidewall.

Figure 7:
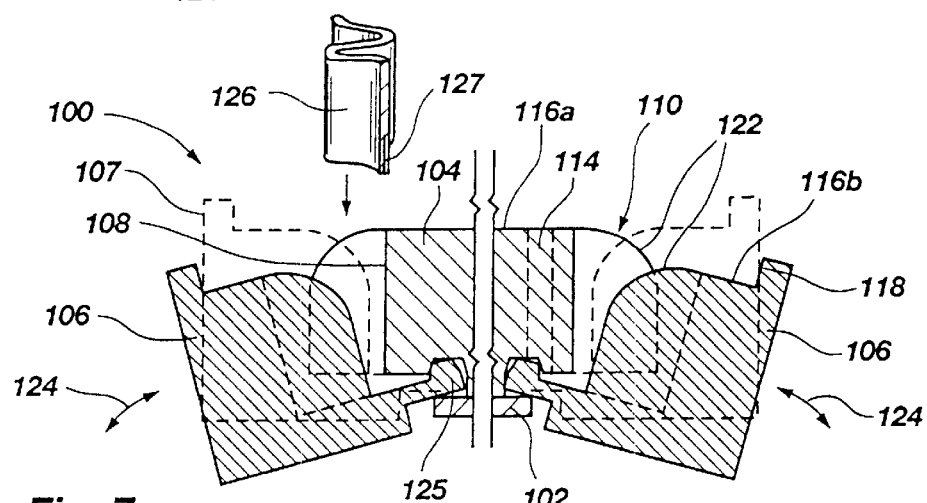
FIG. 7 is a transverse cross-sectional view of a conveyor belt mold configured for forming a belt with integrally formed sidewalls having fabric reinforcement according to the present invention, wherein the side sections of the mold are rotated down and away from the center section.

The present invention is made possible in part by a novel molding and forming process developed by the inventors. Referring to FIGS. 6 and 7, there are shown plan and transverse cross-sectional views of a novel mold 100 configured for forming a belt with integrally formed sidewalls having fabric reinforcement. As with the prior integral forming mold 30 (FIG. 4), the mold 100 comprises a base plate 102, a raised center section 104, and two side sections 106, these components being formed of aluminum or steel so as to be able to withstand the high mechanical and thermal stresses during the molding and curing process. The side sections 106 are spaced some distance away from the sides 108 of the center section 104, so as to form side channels 110, which provide the openings or mold spaces for forming the sidewalls of the belt. Transverse channels 112 or vertical bores 114 are also provided for forming the transverse 26 or upstanding 28 cleats upon the belt as described above.

As with the mold 30 (FIGS. 4, 5) the center section 104 and side sections 106 have generally horizontally aligned top surfaces 116*a* and 116*b* (See FIG. 8), and edge walls 118 for providing the space in which the base belt is formed, as described above. As with the mold of FIGS. 4 and 5, the sides 108 of the center section 104, and the opposing faces of the side sections 106 are formed with alternating protrusions 120, which intersperse to form the corrugated sidewall shape. The alternating protrusions 120 may be formed of separate inserts of steel or aluminum which are machined to the desired shape, then affixed to the sides 108 of the center section 104, and the opposing sides of the side sections 106. The tops 122 of the protrusions 120 are oppositely rounded so as to form the fillet 88 inside each corrugation (FIG. 3).

Unlike the prior mold, however, the side sections 106 are moveable toward or away from the center section 104, as indicated by arrows 124. As shown in FIG. 7 the side sections 106 of the mold 100 are preferably hinged at 125 within a lower portion of the center section 104, such that when rotated they are drawn down and away from the center section, as shown in FIG. 7, or up and toward the center section, to the position shown in phantom lines at 107. This allows a lay-up 126 of raw rubber sheets with fabric reinforcement 127 to be placed into the opened side channel 110. It will be apparent that other hinged configurations of the side sections may also be used. For example, the side sections may be hingedly connected to the center section or the base, and may be connected at a lower or higher position, or a position closer to or farther from the area of the side channels.

Figure 10:
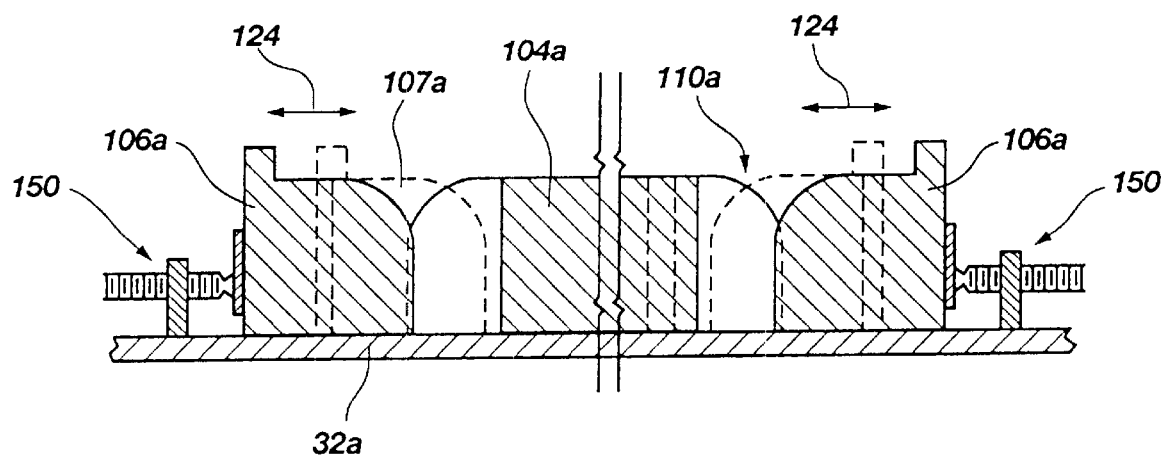
FIG. 10 is a transverse cross-sectional view of a conveyor belt mold according to the present invention, with linearly moveable side sections which are drawn away from the center section.

It will also be apparent that other methods of providing moveable side sections 106 may be devised by those skilled in the art. For example, as shown in FIG. 10, side sections 106*a* may be configured to slide linearly on a base 32*a* toward or away from the center section 104*a*, as shown by arrows 124. The closed position of linearly moveable side sections is shown in phantom lines 107*a* in FIG. 10. The side channel 110*a* is opened or closed by moving the side sections by means of a sliding mechanism 150. The sliding mechanism may comprise screw jacks (powered or unpowered) as depicted in FIG. 10, or other mechanisms such as hydraulic cylinders, servomotors, etc., and may be fastened in a closed position with bolts, wedges, clamps, etc. or simply due to the force of the sliding mechanism. Any configuration which allows the side sections to be drawn away from the center section, so as to allow direct positioning of a full thickness lay-up of rubber and fabric reinforcement into the full height of the side channel, then have the side channel close tightly upon it, will suffice.

Figure 8:
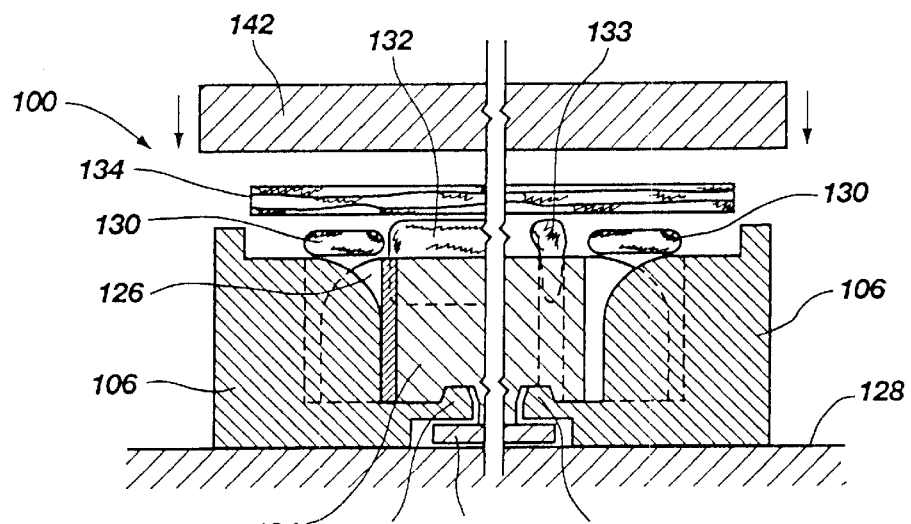
FIG. 8 is a transverse cross-sectional view of a conveyor belt mold according to the present invention, wherein the side sections of the mold are drawn toward the center section, and raw rubber charges with reinforcing fabric are in place for forming the entire belt.

The configuration shown in FIGS. 6–8, wherein the side sections are hingedly connected to the center section and rotate down and away from the center section, is presently preferred because of its simplicity and utility, as will become more apparent. A mold having linearly moveable sidewalls as depicted in FIG. 10 presents a greater likelihood of wear between the sliding components. This wear would tend to raise component replacement costs, and would also tend to open up the mold tolerances, allowing rubber to flow to places where it is not desired. This not only wastes material and causes increased labor costs in the product clean-up stage, but may also partially bring back the problem of fabric movement or displacement in the sidewalls because some of the escaping rubber material would inevitably come from the side channels, thus allowing downward flow in the side channels. It would also be difficult to provide a mechanism which could both move the side sections, and then rigidly hold them together during the pressing operation. The hinged arrangement of FIGS. 6–8 is also preferred because no external restraints (e.g. clamps, anchor blocks, etc) are required on the mold, thus reducing the effective width of the mold assembly for a given belt width, and thereby increasing the width of belts which may be formed with a given press.

Because the side channel 110 is open when the lay-up 126 is placed, the lay-up of rubber and fabric may have a thickness approximately equal to or even greater than the ultimately desired thickness of the finished sidewall. This allows the sidewall to be formed without the need for any significant quantity of rubber to flow down into the side channel during the molding process. As a result, the fabric stays in place, and taller, integrally formed sidewalls are possible. Additionally, because the side channel is open linearly and rotationally, due to the hinged configuration of the side sections, it is easier for a user to place the rubber lay-up into the side channel.

The invention also allows the base belt and sidewalls to be formed of differing materials if desired. For example, it may be desirable to have the sidewalls formed of material that has different properties than the base belt, such as flexibility, strength, chemical resistance, etc. This can be accomplished by using raw rubber for the sidewalls that is chemically different than, though still compatible with, the raw rubber for the base belt. When the belt is pressed and cured, the region where the sidewall connects to the base belt will form a zone of gradual transition from one material to the other, without creating an area of abrupt change in those properties. This gradual change will prevent a weakened interface between the belt and sidewall from forming, and will thus prevent a region where the belt is more likely to break, tear, or degrade, while allowing free selection and variation of material properties.

Viewing FIGS. 7 and 8, to form a belt having fabric reinforced integral sidewalls according to the present invention, a substantially planar lay-up 126 of raw rubber and fabric reinforcement is first placed into the open side channels 110 (FIG. 7). The rubber lay-up 126 typically comprises two layers of raw rubber with a layer of fabric 127 disposed adjacent to an edge of the rubber layers. This edge will become the top edge of the sidewall, but will be placed into the bottom of the side channel for the forming process. The raw rubber lay-up 126 is bent into a corrugated shape and placed into the open side channel 110. The side sections of the mold are then closed by rotating them up and toward the center section, thus clamping the rubber lay-up 126 in the side channel in the corrugated shape. The closing of the side sections is easily accomplished by simply placing the entire mold onto a base 128 (FIG. 8). The weight of the mold itself is sufficient to close the side channels upon the rubber lay-up 126.

Viewing FIG. 8, elongate charges of raw rubber 130 are placed atop the closed side channel for forming the fillets 88, and to fill in any voids in the mold in the area of the junction between the sidewall and base belt. Other charges 132, 133 of raw rubber may be placed atop or partially extending into the transverse channels 112 or vertical bores 114 for forming the transverse or upstanding cleats upon the base belt. As with the prior method, a base belt lay-up 134, comprising a top cover, a bottom cover, and one or more layers of woven fabric reinforcement with additional layers of rubber in between, is then placed atop the mold 100, extending between opposing edge walls 118.

As with the prior method, the mold 100 with the raw rubber charges is placed into a press, and a horizontal press plate 142 is brought to bear upon the bottom cover 138 of the base belt lay-up 134, between the edge walls 118. The press plate 142 presses against the mold as the temperature is elevated for a period of time sufficient to cure the belt, the mold is removed from the press, and the belt is then physically removed from the mold as a finished unit. As noted above, the belt may be exposed to a pressure of from 600 psi to 2000 psi, and at a temperature of from 275° F. to 325° F. for 20 to 60 minutes, depending upon the nature of the raw rubber material and the final material characteristics desired. The invention thus combines the advantages of integral forming of sidewalls with the advantages of fabric reinforcement and taller sidewalls, and improves the manufacturing method and apparatus.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A conveyor belt, comprising:
   (a) an elongate, substantially planar base belt; and
   (b) at least one longitudinal corrugated sidewall extending substantially vertically from a top face of the base belt and along a length thereof, the sidewall being integrally formed (i) with fabric reinforcement disposed therein, and (ii) with the base belt as an integral structure concurrently cured in a mold, such that there is no weakened interface between the sidewall and the base belt.

2. The conveyor belt of claim 1, wherein the base belt and sidewall are comprised of chemically different materials.

3. The conveyor belt of claim 2, wherein a region of transition from the base belt to the sidewall comprises a gradual transition zone from the material of the base belt to the material of the sidewall.

4. The conveyor belt of claim 1, wherein the base belt and sidewall are comprised of substantially identical materials, such that there is substantially no variation in the material properties of the conveyor belt in a region of transition from the base belt to the sidewall.

5. The conveyor belt of claim 1, further comprising:
   (d) two longitudinal sidewalls; and
   (e) a plurality of cleats disposed between the sidewalls along the length of the conveyor belt, and configured for assisting in transporting material placed upon the conveyor belt, the cleats being integrally formed with the base belt such that there is no weakened interface between the cleats and the base belt.

6. The conveyor belt of claim 5, wherein the cleats are formed from structures selected from the group comprising transverse paddles and upstanding protrusions.

7. The conveyor belt of claim 6, wherein the transverse paddles are integrally attached to the sidewalls.

8. The conveyor belt of claim 1, further comprising a solid fillet of material disposed within each corrugation of the sidewall at the junction of the sidewall and the base belt, the fillet being integrally formed with the belt and sidewall.

9. The conveyor belt of claim 1, wherein the sidewall is more than 6 inches high.

10. The conveyor belt of claim 1, wherein the fabric reinforcement is disposed within a top half of the sidewall.

11. The conveyor belt of claim 1, further comprising at least one layer of fabric reinforcement disposed in the base belt.

12. A conveyor belt, comprising:
   (a) an elongate, substantially planar, fabric reinforced base belt; and
   (b) a pair of corrugated, longitudinal sidewalls extending substantially vertically from a top face of the base belt and along a length thereof, the sidewalls being disposed near opposing edges of the base belt, and integrally formed (i) of the material of the base belt, (ii) with fabric reinforcement disposed therein, and (iii) with the base belt as an integral structure concurrently cured in a mold, such that there is no weakened interface between the sidewalls and the base belt.

13. The conveyor belt of claim 12, further comprising a plurality of cleats disposed between the sidewalls along the length of the conveyor belt, the cleats comprising structures selected from the group comprising transverse paddles and upstanding protrusions, and being integrally formed with the base belt such that there is no weakened interface between the cleats and the base belt, the cleats configured for assisting in transporting material placed upon the conveyor belt.

14. The conveyor belt of claim 13, wherein the transverse paddles are integrally connected to opposing sidewalls.

15. The conveyor belt of claim 12, wherein the sidewalls are more than 6 inches high.

16. The conveyor belt of claim 12, wherein the fabric reinforcement is disposed within a top half of the sidewall.

17. The conveyor belt of claim 12, further comprising a solid fillet of material disposed within each corrugation of the sidewall at the junction of the sidewall and the base belt, the fillet being integrally formed with the belt and sidewall.

18. A conveyor belt, comprising:
 (a) an elongate, substantially planar, fabric reinforced rubber base belt; and
 (b) at least one corrugated longitudinal rubber sidewall extending substantially vertically from a top face of the base belt and along a length thereof, the sidewall having substantially identical material properties to the base belt, and being integrally formed (i) with fabric reinforcement disposed therein, and (ii) concurrently cured in a mold as an integral structure with the base belt, such that there is substantially no variation in the material properties of the conveyor belt in a region of transition from the base belt to the sidewall.

19. The conveyor belt of claim 18, further comprising a plurality of cleats disposed between the sidewalls along the length of the conveyor belt, the cleats comprising structures selected from the group consisting of transverse paddles and upstanding protrusions, and being integrally formed with the base belt, such that there is no weakened interface between the cleats and the base belt, the cleats being configured for assisting in transporting material placed upon the conveyor belt.

20. The conveyor belt of claim 18, wherein the sidewall comprises a plurality of corrugations, and further comprising:
 (d) a solid fillet of material disposed within each corrugation of the sidewall at the junction of the sidewall and the base belt, the fillet being integrally formed with the belt and sidewall, and having substantially identical material properties to the base belt and sidewall, such that there is substantially no variation in the material properties of the conveyor belt between the base belt, the sidewall, and the fillet.

* * * * *